US005213181A

United States Patent [19]

Isaka

[11] Patent Number: 5,213,181

[45] Date of Patent: May 25, 1993

[54] WINDER ASSEMBLY HAVING A SPINDLE

[75] Inventor: Akihiko Isaka, Shimosuwa, Japan

[73] Assignee: Sankyo Seiki Mfg. Co., Ltd., Nagano, Japan

[21] Appl. No.: 838,054

[22] Filed: Feb. 19, 1992

[51] Int. Cl.[5] ........ F03G 1/08

[52] U.S. Cl. ........ 185/39; 84/95.2; 185/DIG. 1; 368/214

[58] Field of Search ........ 84/94.2, 95.2; 185/DIG. 1; 368/214; 446/464

[56] References Cited

U.S. PATENT DOCUMENTS

| | | | |
|---|---|---|---|
| 192,425 | 6/1877 | Fisher et al. | 368/214 |
| 1,086,719 | 2/1914 | Kern | 368/214 X |
| 3,199,730 | 8/1965 | Young, Jr. et al. | 84/95.2 X |
| 4,193,648 | 3/1980 | Gargiulo | 84/94.2 |
| 4,651,613 | 3/1987 | Block | 84/95.2 |

FOREIGN PATENT DOCUMENTS

| | | |
|---|---|---|
| 193058 | 12/1983 | Japan . |
| 163724 | 7/1987 | Japan . |

*Primary Examiner*—Allan D. Herrmann

*Attorney, Agent, or Firm*—McAulay Fisher Nissen Goldberg and Kiel

[57] ABSTRACT

A winder assembly comprises a spindle provided with a threaded portion, a winder removably engageable with the threaded portion of the spindle and a holder for holding the winder in position when the threaded portion of the spindle and the winder are disengaged from each other, the winder being provided with a perforated guide having a diameter of perforation substantially equally to the diameter of the threaded portion of the spindle. Such an assembly may be suitably used for a music box containing an automatic instrument or the like because it can be easily fitted to a music box and used to operate the music box by simply rotating the winder. Moreover, the winder is provided with a hollow section having a diameter or perforation substantially equal to the diameter of the bolt section of the spindle, the winder can be hardly tilted to damage the stopper, or holder, and separated from the spindle to become an unintended hazard to little children.

10 Claims, 3 Drawing Sheets

WINDER ASSEMBLY HAVING A SPINDLE

BACKGROUND OF THE INVENTION

1. Field of Invention

This invention relates to a winder assembly comprising a spindle and a winder for rotating the spindle surrounded by a helical spring in order to wind the spring tightly around the spindle. Such an assembly may be suitably used for a music box containing an automatic instrument or the like.

2. Background Art

Known music boxes containing an automatic instrument and used as toys for little children are normally provided with a winder key having a threaded bore that forms a nut section. The winder key is removably fitted to the spindle of the music box through engagement of the threaded bore and a corresponding threaded section of the spindle or a bolt section, so that the winding of a helical spring arranged around the spindle may be tightened by hand to cause the automatic instrument of the music box to play music. However, if removed from the spindle, the winder key can become hazardous to small children because it is very small and can be easily swallowed by a little child. In an attempt to avoid this problem, a winder key which is nonremovably fitted to the spindle of a music box has been proposed in Japanese Utility Model No. Shou 58-193058.

However, the proposed winder key is accompanied by certain drawbacks. For one thing, it comprises a relatively large number of components and for another, it is so designed that it is prepared separately and independently from a matching automatic instrument and mounted to a product (such as a toy containing the automatic instrument) in the final stages of assembling operation by a toy maker. The toy maker is normally different from the manufacturer of the automatic instrument and the winder key, making mounting of the winder key cumbersome.

While the above described problem is resolved by the inventor of the present invention in a manner as disclosed in Japanese Utility Model No. Shou 62-163724, which teaches the use of a stopper having a claw for prevention of unintended removal of the winder key, this utility model is accompanied by a problem of elastic deformation of the arm of the stopper that can tilt and eventually release the winder key or a damaged claw of the stopper. Such a problem can occur particularly when the spindle and the winder key are disengaged but the claw is held in the groove of the spindle while the winder key is subjected to a lateral force.

SUMMARY OF THE INVENTION

It is therefore an object of the present invention to provide a winder assembly for a music box comprising a spindle, a winder and a winder holder, or a stopper that can be easily fitted to the winder, which can securely hold it in position, and which remains free from damage even when subjected to lateral force.

According to the invention, the above object is achieved by providing a winder assembly comprising a spindle provided with a threaded portion, a winder removably enageable with the threaded portion of the spindle and a holder for holding the winder in position when the threaded portion of the spindle and the winder are disengaged from each other. The winder is provided with a perforated guide means having a diameter of perforation substantially equal to the diameter of the threaded portion of the spindle.

Now, the present invention will be described by referring to the accompanying drawings that illustrate a preferred embodiment of the invention.

DETAILED DESCRIPTION OF THE INVENTION

Figure 1:
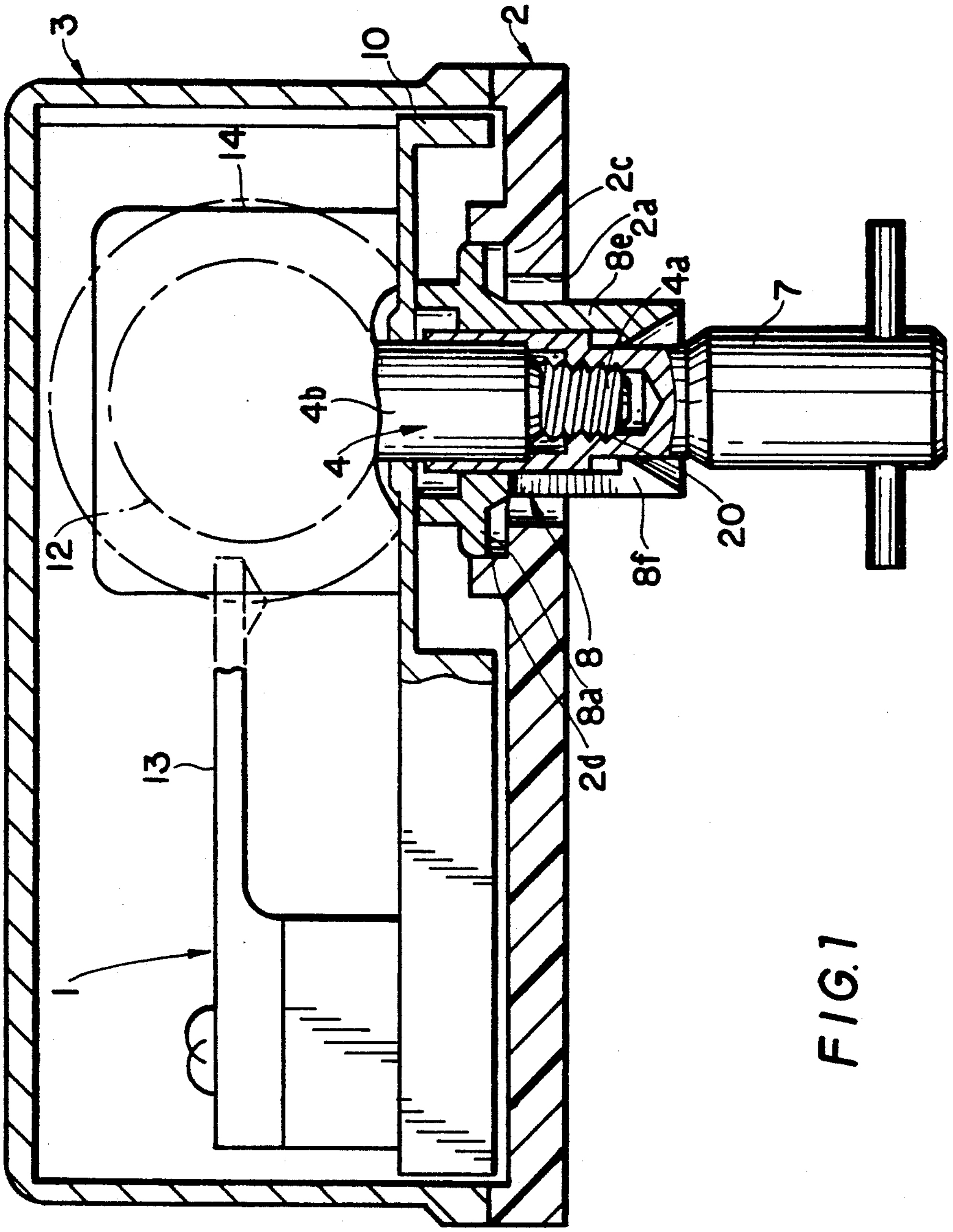
FIG. 1 is a schematic section view of a music box provided with an embodiment of the invention.
Figure 2:
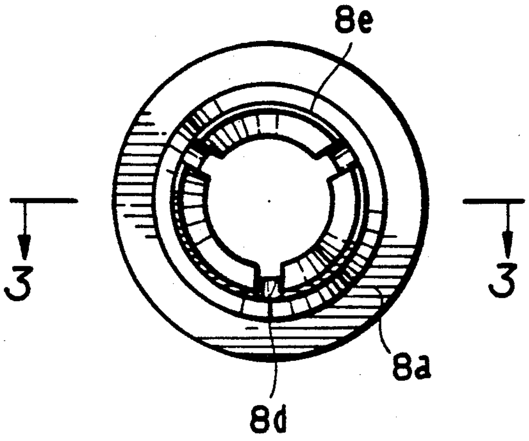
FIG. 2 is a plan view of the holder, or stopper, of the embodiment.
Figure 3:
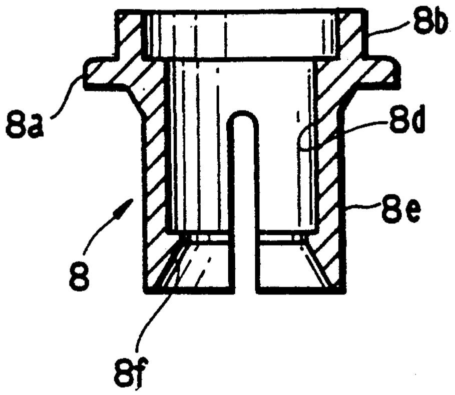
FIG. 3 is a sectional view of the holder of FIG. 2 taken along the 3—3 line.
Figure 4:
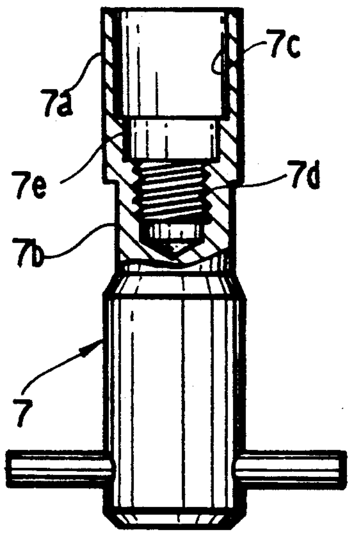
FIG. 4 is a lateral sectional view of the winder of the embodiment of FIG. 1.

Referring to FIGS. 1 through 5, the embodiment comprises an automatic instrument 1 having a frame 10, a base plate 2 made of synthetic resin, a case 3 surrounding the frame and engaged with or welded to the base plate 2 and a shield box 14 rigidly fitted onto the frame 10 and containing a spindle 4 having a threaded portion 4*a* and a stem portion 4*b* and a helical spring (not shown) arranged around the spindle 4.

The base plate 2 is provided with a through bore 2*a* through which the spindle 4 runs to operate the automatic instrument 1. A guide plate 2*d* is arranged around the through bore 2*a* on the upper surface of the base plate 2 and an anti-fallout collar section 2*c* extends inwardly under the guide plate 2*d* to carry an outer collar section 8*a* of a holder 8, or stopper, in such a manner that the holder 8 may be axially moved by the guide plate 2*d*.

The stopper 8 comprises a collar section 8*a*, a tubular section 8*b* projecting upward from the collar section 8*a*, a hollow section 8*d* extending downward from the collar section 8*a* for receiving a cylindrical portion 7*a* of a winder 7 and a plurality of elastic arms 8*e* extending further downward from the hollow section 8*d*, each having a claw 8*f* extending inwardly at the bottom for securely holding the winder 7.

The winder 7 comprises a cylindrical portion 7*a*, a peripheral groove 7*b* cut into the cylindrical portion 7*a*, a perforated section 7*c*, or guide means, for receiving the large diameter portion 4*b* of the spindle 4, a threaded section 7*d*, or nut section, capable of being engaged with the threaded section 4*a*, or bolt section, of the spindle 4 and a hollow section 7*e* arranged between the nut section 7*d* and the perforated section 7*c* and having a diameter smaller than the diameter of perforation of the perforated section 7*c* and substantially equal to the diameter of the bolt section 4*a* of the spindle 4 so that the bolt section 4*a* may pass therethrough.

When the winder 7 is brought into engagement with the spindle 4, the claws 8*f* of the stopper 8 are forced to outwardly expand and the cylindrical portion 7*a* of the winder 7 is placed on the spindle 4 so that the former may be rotated around the latter. Then, the winder 7 advances along the spindle 4 as it is rotated by hand until the claws 8*f* fall into the peripheral groove 7*b*. Under this condition, the stopper 8 is moved toward the frame 10 by the winder 7 until it comes to abut the frame 10 and halts there as illustrated in FIG. 1. Thereafter, only the winder 7 is made to advance further through the stopper 8 until its nut section 7*d* comes into engagement with the bolt section 4*a*, the winder 7 does not advance any further and the spindle 4 is rotated with the winder 7 to tighten the winding of the helical spring 20 arranged around the spindle 4.

Figure 5:
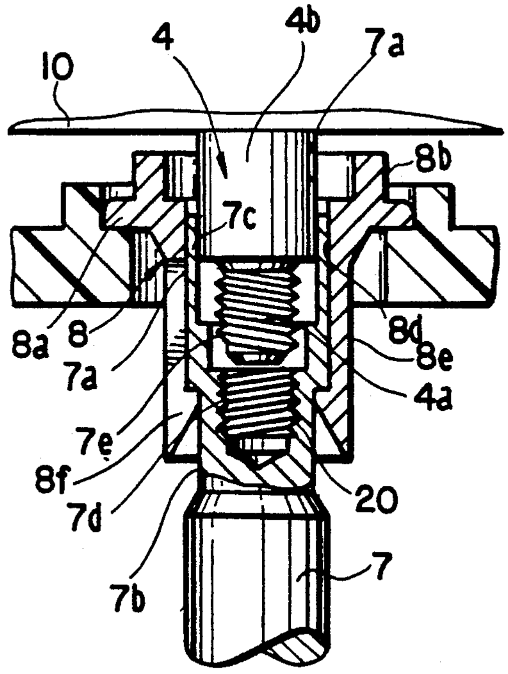
FIG. 5 is a partial sectional view of the embodiment of FIG. 1, showing the winder in greater detail.
Figure 6:
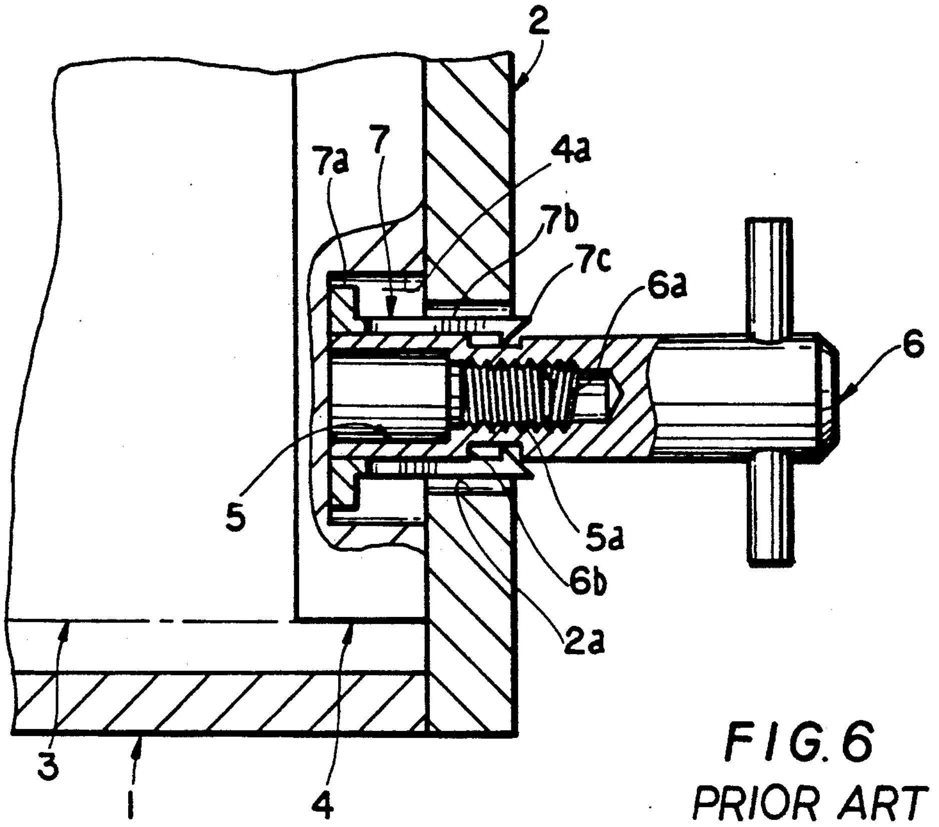
FIG. 6 PRIOR ART
FIGS. 6 and 7 represent prior art sectional views of the winder key portions of a music box.
Figure 7:
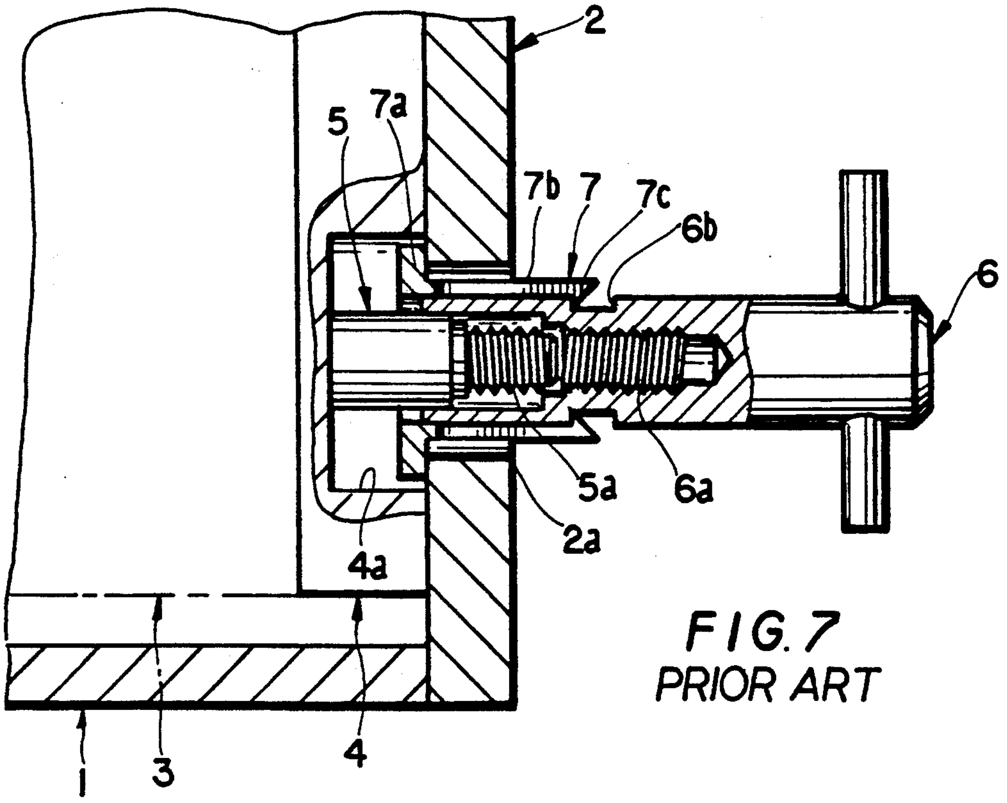
FIG. 7 PRIOR ART

Once the claws 8*f* fall into the peripheral groove 7*b* of the winder 7, the latter would not come off even if it is rotated reversely by an individual who may be a little child, in an attempt to remove the winder 7 from the music box, because the claws 8*f* hold the winder 7 and the winder 7 can only idly rotate even if the nut section 7*d* of winder 7 is fully disengaged from the bolt section 4*a* of the spindle 4 and brought back to a condition as illustrated in FIG. 5. Since the large diameter portion 4*b* of the spindle 4 is located in the perforated section 7*c* having a diameter of perforation substantially equal to the diameter of the section 4*b* and the bolt section 4*a* is found in the hollow section 7*e* having a diameter substantially equal to that of the bolt section 4*a*, under this condition, the winder is not allowed to tilt and therefore come off.

If the music box is dropped while the spindle 4 and the winder 7 are in the condition of FIG. 5 and subjected to a large impact along the axial direction of the winder 7, the winder 7 and the spindle 4 can move only slightly toward the music box because the front end of the cylindrical portion 7*a* abuts the frame 10 and blocks any further movement of the winder 7. Further, the shield box 14 is protected against any significant impact because the frame serves as a shock absorber.

When the winding of the helical spring is fully tightened by rotating the winder 7 with the spindle 4, the drum 12 of the automatic instrument is rotated by the resilient force of the spring to play music as the pins arranged around the drum 12 hit the vibrator panels 13 in a predetermined manner.

While the groove 7*b* of the winder 7 is realized in the form of an annular groove in the above described embodiment, it may be modified to any appropriate form so long as it can receive claws 8*f* and securely hold them there so that the stopper 8 may be rotated with the winder 7.

Since the claws 8 may be held in the groove 7*b* only when the bolt section 4*a* of the spindle 4 and the nut section 7*d* of the winder 7 are disengaged from each other, they may be arranged so that they only abut the peripheral surface of the winder 7 while the bolt section 4*a* and the nut section 7*d* are mutually engaged.

The stopper 8 may be integrally formed with the base plate 2 so that the base plate 2 is provided with a hollow section and a plurality of claws.

In other words, the stopper may be either a movable or a stationary component (integral with the base plate) so far as a first requirement that the claws 8*f* are located behind the front end (or below the upper end in FIG. 1) of the groove 8*b* when the stopper is not axially movable (as illustrated in FIG. 1) and the bolt section of the spindle and the nut section of the winder are fully engaged with each other and a second requirement that the claws 8*f* fall into the groove 7*b* when the stopper cannot be moved any further toward the plate (as illustrated in FIG. 5) and the bolt section of the spindle and the nut section of the winder are completely disengaged from each other.

The application of the present invention is not limited to a music box and it may be used for any toy comprising a helical spring as a power source.

As is apparent from the above description, a winder assembly according to the invention can be easily fitted to a music box and used to operate the music box by simply rotating the winder. Moreover, the winder is provided with a hollow section having a diameter or perforation substantially equal to the diameter of the bolt section of the spindle, the winder can be hardly tilted to damage the stopper, or holder, and separated from the spindle to become an unintended hazard to little children.

While the foregoing description and drawings represent the preferred embodiments of the present invention, it will be obvious to those skilled in the art that various changes and modifications may be made therein without departing from the true spirit and scope of the present invention.

What is claimed is:

1. A winder assembly comprising:
a spindle provided with a threaded portion;
a winder removably engageable with the threaded portion of said spindle; and
a holder for holding said winder in position when said threaded portion of the spindle and the said winder are disengaged from each other;
said winder being provided with a perforated guide means having a diameter of perforation substantially equal to the diameter of the threaded portion of the spindle.

2. A winder assembly comprising:
a spindle provided with a threaded portion and a large diameter portion;
a winder removably engageable with the threaded portion of said spindle; and
a frame;
a holder integrally affixed to said frame;
said winder and said holder being provided with engaging means for mutual engagement when said threaded portion of the spindle and said winder are disengaged from each other;
said winder being further provided with a perforated guide means having a diameter of perforation substantially equal to the diameter of the threaded portion of the spindle.

3. A winder assembly comprising:
a spindle provided with a threaded portion and a large diameter portion;
a winder removably engageable with the threaded portion of said spindle; and
a holder provided with a device for holding said winder in position when said threaded portion of the spindle and the winder are disengaged from each other;
said winder and said holder being provided with engaging means for mutual engagement when said threaded portion of the spindle and said winder are disengaged from each other;
said winder being further provided with a perforated guide means having a diameter of perforation substantially equal to the diameter of the threaded portion of the spindle.

4. A winder assembly according to claims 2 or 3, wherein said holder comprises an elastic portion capable of being elastically deformed when said winder is fitted to said spindle and an engaging section for engagement with the winder.

5. A winder assembly according to claims 2 or 3, wherein said guide means is provided with a hollow section having a diameter substantially equal to that of the large diameter portion of the winder.

6. A winder assembly according to claims 2 or 3, wherein said engaging means comprises a groove formed on the peripheral surface of the winder and a plurality of claws arranged on the holder.

7. A winder assembly according to claim 6, wherein said groove formed on the peripheral surface of the winder is an annular groove.

8. A winder device to be suitably used for an automatic instrument of a music box comprising a winder having a groove on the peripheral surface of said winder and having a threaded portion for engagement with a corresponding threaded portion of a spindle, said spindle also having a larger diameter portion, and a stopper integrally arranged with a stationary component and having claws to be received and held by the groove, said claws and said groove being so arranged that they are located face-to-face and engaged with each other when the threaded portion of the spindle and that of the winder are disengaged from each other, said winder being further provided with a hollow section for receiving the larger diameter portion and the threaded portion of the spindle when said threaded portion of the spindle and said threaded portion of the winder are disengaged from each other.

9. A winder device to be suitably used for an automatic instrument of a music box comprising a winder having a groove on the peripheral surface of the winder and having a threaded portion for engagement with a corresponding threaded portion of a spindle, said spindle also having a larger diameter portion, and a stopper provided with a device for securely holding a stationary component and having claws to be received and held by the groove, said claws and said groove being so arranged that they are located face-to-face and engaged with each other when the threaded portion of the spindle and that of the winder are disengaged from each other, said winder being further provided with a hollow section for receiving the larger diameter portion and the threaded portion of the spindle when said threaded portion of the spindle and said threaded portion of the winder are disengaged from each other.

10. A winder assembly comprising:

a spindle provided with a threaded portion;

a winder removably engageable with the threaded portion of said spindle, said winder being provided with a perforated guide means having a diameter of perforation substantially equal to the diameter of the threaded portion of the spindle; and a holder for holding said winder in position when said threaded portion of the spindle and said winder are disengaged from each other, said holder comprising an elastic portion capable of being elastically deformed when said winder is fitted to said spindle and an engaging section for engagement with the winder.

* * * * *